(12) United States Patent
Rothenberger (10) Patent No.: US 8,730,457 B2
(45) Date of Patent: May 20, 2014

(54) SENSOR ARRANGEMENT FOR OBJECT RECOGNITION

(75) Inventor: Bernd Rothenberger, Rheinhausen (DE)

(73) Assignee: Sick AG, Waldkirch (DE)

( * ) Notice: Subject to any disclaimer, the term of this patent is extended or adjusted under 35 U.S.C. 154(b) by 271 days.

(21) Appl. No.: 13/307,755

(22) Filed: Nov. 30, 2011

(65) Prior Publication Data

US 2012/0140202 A1    Jun. 7, 2012

(30) Foreign Application Priority Data

Dec. 1, 2010   (DE) .......................... 10 2010 060 942

(51) Int. Cl.
*G01C 3/08*  (2006.01)

(52) U.S. Cl.
USPC .......... 356/4.01; 356/3.01; 356/4.1; 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 6,879,384 B2 | 4/2005 | Riegl et al. |
| 2009/0265105 A1 | 10/2009 | Davis et al. |

FOREIGN PATENT DOCUMENTS

| DE | 43 40 756 A1 | 6/1994 |
| DE | 10 2004 043 515 A1 | 3/2006 |
| DE | 10 2009 015 922 A1 | 10/2010 |
| EP | 1 321 777 A2 | 6/2003 |

OTHER PUBLICATIONS

Cui, et al., "Multi-modal tracking of people using laser scanners and video camera," Image and Vision Computing, (2008), vol. 26, pp. 240-252.*
Mure-Dubois, et al., "Fusion of Time of Flight Camera Point Clouds," http://www-imt.unine.ch/parlab, (2008), XP007914303, twelve (12) pages.
Rabbani, et al., "An integrated approach for modelling and global registration of point clouds," ISPRS Journal of Photogrammetry & Remote Sensing, (2007), vol. 61, pp. 355-370.
Fischler, et al., "Random Sample Consensus: A Paradigm for Model Fitting with Applications to Image Analysis and Automated Cartography," Communications of the ACM, (1981), vol. 24, No. 6, pp. 381-395.
European Search Report, Application No. EP 11 18 5110, mailed on Jan. 26, 2012, twelve (12) pages.

(Continued)

*Primary Examiner* — Luke Ratcliffe
(74) *Attorney, Agent, or Firm* — Nath, Goldberg & Meyer; Jerald L. Meyer (57) ABSTRACT

A sensor arrangement for object recognition in a monitored zone is provided having a first and second distance-measuring optoelectronic sensor whose fields of vision overlap, and having a common control unit which is formed for determining a position of a calibration target in the overlap region with respect to the first and second sensor to determine a transformation instruction between coordinate systems of the sensors in a registration mode so that measured points of the sensors can be combined in a common global coordinate system. The common control unit is designed to determine positions of the calibration target with respect to the first and second sensor and to determine that transformation instruction which brings a connection line between the positions with respect to the first sensor's coordinate system to cover the connection line between the positions with respect to second sensor's coordinate system.

23 Claims, 4 Drawing Sheets

(56) References Cited

OTHER PUBLICATIONS

Liang, "A New and Efficient Transform for Curve Detection," Journal of Robotic Systems, (1991), pp. 841-847.

Tarsha-Kurdi, "Hough-Transform and Extended Ransac Algorithms for Automatic Detection of 3D Building Roof Planes from Lidar Data," IAPRS, (2007), vol. XXXVI, Part 3, pp. 407-412.

Zhang, "Flexible Camera Calibration by Viewing a Plane from Unknown Orientations," Microsoft Research, (1999), eight (8) pages.

Zhao, et al., "A Robust Method for Registering Ground-Based Laser Range Images of Urban Outdoor Objects," PE&RS, (2001), vol. 67, No. 10, pp. 1143-1153.

Ripperda, Nora, et al., "Marker-Free Registration of Terrestrial Laser Scans Using the Normal Distribution Transform," pp. 1-7, Institute of Cartography and Geoinformatics, University of Hannover, Germany.

Besl, Paul J., et al., "A Method for Registration of 3-D Shapes," IEEE, Feb. 1992, pp. 239-256, vol. 14, No. 2.

Cui, Jinshi, et al., "Mutli-Modal Tracking of People Using Laser Scanners and Video Camera," Image and Vision Computing, 2007, pp. 1-13, Elsevier B.V.

Biber, Peter, "The Normal Distributions Transform: A New Approach to Laser Scan Matching," pp. 1-6, University of Tubingen, Germany.

Zhao, Hujing, et al., "A Robust Method for Registering Ground-Based Laser Range Images of Urban Outdoor Objects," Photogrammetric Engineering & Remote Sensing, Oct. 2001, pp. 1143-1153, vol. 67, No. 10, American Society for Photogrammetry and Remote Sensing.

Fitzgibbon, Andrew W., "Robust Registration of 2D and 3D Point Sets," pp. 1-10, Department of Engineering Science, University of Oxford.

Bornaz, L., et al., "Terrestrial Laser Scanner Data Processing," pp. 1-6.

German Examination Report corresponding to German Application No. 10 2010 060 942.0 filed Aug. 8, 2011, in German language, five (5) pages.

\* cited by examiner

SENSOR ARRANGEMENT FOR OBJECT RECOGNITION

The invention relates to a sensor arrangement for object recognition in a monitored zone having at least two distance-measuring sensors in accordance with the preamble of claim 1 as well as to a method for registering a plurality of distance-measuring sensors in accordance with the preamble of claim 11.

Laser safety scanners such as are known from DE 43 40 756 A1 are frequently used for the monitoring of work areas. A light beam generated by a laser periodically sweeps over a monitored zone with the aid of a deflection unit. The light is remitted at objects in the monitored zone and is evaluated in the scanner. A conclusion is drawn on the angular position of the object from the angular position of the deflection and additionally on the distance of the object from the laser scanner unit from the light transit time while using the speed of light. In this respect, two general principles are known to determine the light transit time. In phase-based processes, the transmitted light is modulated and the phase shift of the received light with respect to the transmitted light is evaluated. In pulse-based processes, such as are preferably used in safety technology, the laser scanner measures the transit time until a transmitted light pulse is received again.

An important technical safety application is the securing of machines which form a source of danger. In this respect, the sensor monitors a protected field defined within the monitored zone which may not be entered by an operator during the operation of the machine. If the sensor recognizes an unauthorized intrusion into the protected field, for instance a leg of an operator, it triggers an emergency stop of the machine. Other intrusions into the protected field, for example by static machine parts, can be taught as permitted in advance. Warning fields are frequently disposed in front of the protected fields where intrusions initially only result in a warning to prevent the intrusion into the protected field and thus the securing in good time and so increase the availability of the plant.

Sensors used in safety technology have to work particularly reliably and must therefore satisfy high safety demands, for example the EN 13849 standard for safety of machinery and the machinery standard EN 1496 for electrosensitive protective equipment (ESPE). A number of measures have to be taken to satisfy these safety standards such as reliable electronic evaluation by redundant, diverse electronics, function monitoring or specifically monitoring the soiling of optical components, in particular of a front screen, and/or provision of individual test targets with defined degrees of reflection which have to be recognized at the corresponding scanning angles.

It is frequently not possible to cover the whole zone to be monitored using a single sensor. For example, a laser scanner orientated toward the front at a vehicle is blind with respect to incidents at the rear. However, the resolution within the field of view of a sensor is also no longer sufficient reliably to recognize smaller objects after a certain distance. In addition, shadowing effects can prevent an individual sensor from detecting all objects in the direction of sight. One alternative comprises using a plurality of sensors and merging their data.

The data sets of a scene determined by a plurality of sensors from different perspectives first relate to their respective own coordinate systems. To be able to evaluate these data in a common coordinate system, a corresponding transformation instruction has to be determined. The joining together of a plurality of images from different perspectives is called registering. The position and orientation of one sensor is frequently known and the position and orientation of the other sensors are determined via a registration relative to this one sensor. This is equivalent to the problem of finding a transformation instruction from the coordinate system of a respective sensor in a common global coordinate system. The registration cannot be easily automated conventionally, but rather requires additional measures and in-depth knowledge to interpret the sensor data. This is a substantial hurdle to using such multiple sensor arrangements in applications relevant to safety.

A method for detecting an object is disclosed in DE 10 2004 043 515 A1 in which at least two sensors each monitor a portion of the monitored zone and whose individual images are generated in a common coordinate system. It is known from EP 1 405 100 B1 to use a plurality of sensors to monitor the adjacent region. However, these documents do not say anything on the question of registration and already assume that the two sensors are aware of their mutual coordinate systems.

A usual, but very complex measure for assisting the registration comprises arranging special marks, for example retro-reflectors, in the common visual field of the sensors. It is moreover known to present a narrow cylindrical target in different positions to a plurality of horizontally mounted laser scanners. Cylindrical targets are, however, very similar to a human leg in safety applications. The registration requires the target to be brought to different positions and in each case to define a region in the image interactively in which the target is located since an automatic recognition is not reliable. The registration can thus here also only be carried out with an effort and by correspondingly qualified technical personnel.

There are known methods which carry out a registration solely from the measured data. The ICP (iterative closest point) algorithm is used for this purpose in P. Besl and N. McKay, "*A method for registration of 3-D shapes*", IEEE PAMI 14(2):239-256, 1992. Another method is known as NDT (normal distribution transform) and is discussed in the papers of P. Biber, "*The normal distributions transform: a new approach to laser scan matching*", Technical report 3, Wilhelm Schickard Institute for Computer Science, Graphical-Interactive Systems (WSI/GRIS), University of Tubingen or N. Ripperda and C. Brenner, "*Marker-free registration of terrestrial laser scans using the normal distribution transform*", 3D-ARCH 2005. However, these algorithms only converge when good starting conditions are predefined from a manual rough orientation.

In another known approach from L. Bornaz, F. Rinaudo, "*Terrestrial laser scanner data processing*", International Archives of Photogrammetry and Remote Sensing, Commission V, ISPRS XX Congress, Istanbul, Turchia, 12-23 Jul. 2004, natural features such as corners are used as marks. These natural features have to be marked by the user and if a scene does not have at least two suitable features, the registering fails.

H. J. Zhao and R. Shibasaki, "*A robust method for registering ground-based laser range images of urban outdoor objects*", Photo. Eng. Remote Sensing 67 (10) (2001) 1143-1153 utilize striking line segments of natural objects for registering a plurality of scanners, with the optimization including the finding of line correspondences. This method is used in Jinshi Cui, Hongbin Zha, Huijing Zhao, Ryosuke Shibasaki, "*Multi-modal tracking of people using laser scanners and video camera*", Image and Vision Computing 2007 to count persons in an external application. The successful registering obviously depends on the presence of corresponding line segments.

Andrew Fitzgibbon, "*Robust registration of 2D and 3D point sets*", Image and Vision Computing 2003 and BMVC 2001 describes a method of registering 2D and 3D data, but in this respect only looks at point correspondences.

There is thus no known possibility of fusing laser scanners and similar sensors without laborious additional measures or in-depth technical knowledge being required in this process.

In the unpublished European patent application under the file reference EP 10154904, a planar calibration target, for example a plane of a size of approximately 50 cm×50 cm is used which is easy to guide and can simultaneously be localized very well in the measured data. This calibration target is guided through a common field of vision of the sensors. In this respect, it can be detected by each of the sensors to be registered to determine the position and orientation of the calibration target in their respective own coordinate systems. A transformation is then calculated from this information which defines the geometrical rotation and translation of the sensors.

Even with this procedure, a further problem remains in the automatic geometrical registration of optical multidimensional distance measurement sensors. The calculation of the position and orientation of the calibration target is namely always subject to error due to the noise portions of the measured values of the sensors.

Under the assumption of statistical noise, the arising registration error can be reduced in that the calibration target is presented and moved in the visual field over a certain time period so that a large number of transformations can be averaged. A normally distributed error is, however, in this respect only reduced by the root of the repetitions. On high demands on the precision, considerably more transformations therefore have to be calculated in dependence on the noise portion of the measured data than acceptable with a comfortable and fast registration process.

The object of the invention is therefore to register a plurality of sensors in a simple and reliable manner.

This object is satisfied by a sensor arrangement in accordance with claim 1 and by a method of registering a plurality of distance measuring optoelectronic sensors in accordance with the invention in accordance with claim 11. In this respect, the invention starts from the basic idea of fusing a plurality of sensors for an enlarged field of vision, for a better resolution, for avoiding shadowing effects or, optionally, also for combining different heterogeneous sensor principles. An automatic registration takes place with reference to measured data of a calibration target for this purpose. The position and orientation of this calibration target are generally detected. A finding of the invention is now that, when noise portions of the measured data are taken into account, a very precise determination of the position, but not of the orientation, of a calibration target is possible. The position, but not the orientation, of the calibration goal is therefore used in accordance with the invention. Orientation information is instead acquired from the connection line between a plurality of different positions of the calibration target. Something like a large, virtual calibration body thereby arises. It is advantageous for a precise registration if the first and the second positions have a larger spacing from one another so that a large basis for the transformation is provided.

The invention has the advantage that a precise registration is made possible despite noisy measured data. A dimension can be given for the remaining registration error so that clear specifications for the fused sensor system can be given which also satisfy technical safety standards. In this respect, very few steps are nevertheless sufficient, and thus a brief registering time in which the calibration target is presented to the sensors. The calibration target can in this respect be small and easy to handle. The procedure is robust and simultaneously user-friendly, requires practically no prior knowledge from the user and can therefore be seamlessly integrated into existing configuration processes. A manual reworking or interpretation of the data is not required for the registration.

The common control unit is preferably independent of the laser scanner and of the further sensor. It is, however, also conceivable to provide the common control unit as part of one of the sensors of the sensor arrangement or even to implement it as a distributed system.

The common control unit is preferably designed to determine in the registration mode at least one third position different from the first position and from the second position with respect to the first sensor and with respect to the second sensor and to determine the transformation instruction as that transformation instruction which causes a plurality of connection lines, or all connection lines, between the positions with respect to the first coordinate system to cover corresponding connection lines with respect to the second coordinate system as best as possible. A quadratically growing plurality of possible connection lines arise through every additional position so that an even higher precision of the registration is also quickly achieved. In this respect, all combinatorily possible connection lines do not necessarily have to be evaluated, but a selection can rather be made, for example of longer connection lines or such which are as much as possible not parallel to one another. Since the best transformation for a specific connection line does not necessarily also represent the optimum for the other connection lines, the system is over-determined as a rule. A suitable optimization process can then be used, for example a least mean square process.

The calibration target preferably has a planar surface, wherein the common control unit is designed to form clusters from the measured points respectively taken in one pose of the calibration target and to recognize the calibration target in the cluster as a line. A simple and easily available calibration target is thus used which only has to have one flat side. A plane, that is a cardboard plate or a plastic plate, for example, is particularly suitable. A planar surface can be localized particularly simply and reliably in the measured data because typically a particularly high number of measured points are detected and in this respect the planar surface will automatically differ from other foreground objects such as arms or legs. An improved registration with few systematic measurement errors in the sensor data results from this. If the sensor is a two-dimensional sensor with a monitored plane such as in the case of a laser scanner, the planar surface of the calibration target thus intersects the monitored plane in a line and these lines are used for the registering.

The common control unit is preferably designed to recognize the line in the cluster using a RANSAC process in which a sample of measured points is repeatedly drawn from the cluster and a determination is made how well a line through the sample represents the cluster. A RANSAC algorithm is particularly suitable to estimate the position of the lines or areas fast and reliably and thus subsequently to find the required transformation. It is precluded by the repeated taking of the samples that only those samples are randomly used which badly represent the associated clusters. Alternatively, other processes are also conceivable to find a line representing the cluster. In the simplest case, only a center line is placed through the cluster. In this respect, however, differently than in a RANSAC process, all noisy measured values enter into the line estimate with the same weight.

The common control unit is preferably designed to determine the position of the calibration target from a bundle of a plurality of lines which are determined in respective different poses of the calibration target, in particular to determine the position as the center of the bundle. A position estimate is thus based on a plurality of poses of the calibration target and becomes very accurate due to the static error distribution on the basis of noisy measured data. The center of the bundle is, for example, assumed to be its position. A common intersection of the individual lines can be determined as the bundle center. Due to the unavoidable movements in translation of the calibration target at a position, the lines will as a rule not intersect at a geometric point so that instead a point is looked for which comes as close as possible to a common intersection.

The common control unit is preferably designed to evaluate so many different poses of the calibration target that the position can be determined with a predetermined accuracy from the bundle of associated lines, in particular to give feedback to an operator as to whether further poses are still required for the achieving of the predefined precision. In this respect, the poses of the calibration target are not, for instance, requested individually for a practical registration process, but rather automatically derived after one another from a pivot movement. Ten or more multiple measurements of different poses are thereby easily possible in less than one second. It is then signaled by optical or acoustic feedback to the operator who is guiding the calibration target whether the position detection was successful or whether the pivot movement has to be continued or repeated respectively. The accuracy is given, for example, as a statistical confidence interval, for instance in the form of a 5S environment. A typical required position error in the case of laser scanners as sensors to be registered is less than one centimeter so that angular errors of less than one tenth of a degree can be realized.

The common control unit is preferably designed to determine measured points of the sensors without the calibration target in their visual field in order to blend out these measured points as a background during the registering and/or during the measurement operation. Objects are frequently located in the scene, also objects with planar surfaces such as workbenches or the like. Only the foreground objects of interest remain in the measured data through this step.

The sensor arrangement preferably includes at least one third sensor, with the common control unit being designed to register pair-wise in each case a plurality of sensors, whose fields of view overlap at least pairwise at least in part, and subsequently to distribute registration errors equally over all pairs of sensors. The field of vision is additionally expanded with every further sensor. This advantage would largely be lost if all the sensors had to overlap in a portion of their fields of vision for registratoin. On the other hand, the pair-wise registration results in an accumulated registration error. Since this error is subsequently equally distributed, it is possible nevertheless to observe the demands on precision. Provided that more than two sensors have a common field of vision, they can also be registered together instead of pair-wise with respect to one another in that the connection lines in the respective coordinate systems of all these sensors are brought to coincide together by an optimization process such as a least mean square process.

The sensors are preferably designed as laser scanners whose monitored zone is a monitored plane and which each have a light transmitter for transmitting a light beam, a light receiver for generating a received signal from the light beam remitted by an object in the monitored plane, a movable deflection unit for the periodic sampling of the monitored plane and a light transit time determination unit for determining distance from the time difference between the transmission and reception of the light beam. After registration has taken place, a "virtual laser scanner" with an enlarged field of vision arises from a user's point of view by the fusion of two or more laser scanners.

The monitored planes of the laser scanners particularly preferably lie in the same plane. In this respect, a tilt and a spacing of the planes is allowed within the framework of tolerances. Even if the sensors monitor the same plane, the monitored zones are still not thereby identical since the sensors do not necessarily have angles of view of 360°. Even with sensors with all-round view, a fusion can be sensible to view shadowed regions or to achieve higher local resolutions. Sensors can also be mounted headfirst with respect to one another; this has to be recognized in the registration. Due to the restriction to laser scanners with the same monitored plane, all six degrees of freedom of the general three-dimensional case do not have to be determined in the registration, but only two degrees of freedom of translation and one degree of freedom of rotation of a two-dimensional problem.

A secure output is advantageously provided via which a switch-off signal can be output by the common control unit to a monitored danger source when an unauthorized object intrusion into a protected zone is recognized. Such an output is usually made with two channels and is often called an OSSD (output signal switching device). The sensors themselves as well as the common control unit are preferably also designed in the sense of the standards named in the introduction or their equivalents. The fused sensors can then be used without restriction in technical safety applications.

The method in accordance with the invention can be further developed in a similar manner and shows similar advantages in so doing. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in.

Figure 1:
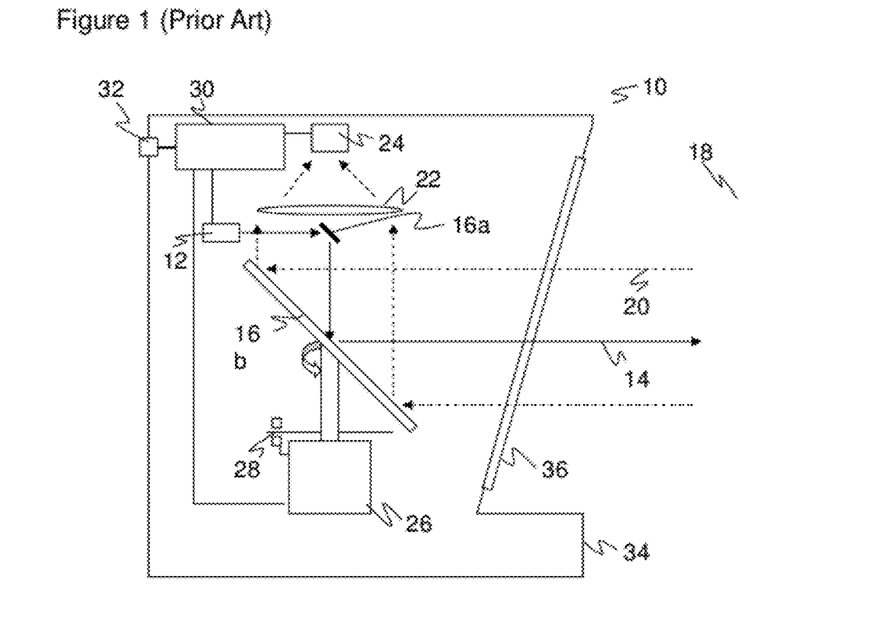
FIG. 1 a schematic sectional representation of a distance measuring laser scanner in accordance with the prior art.

The known general operation of a distance measuring laser scanner 10 will first be described with reference to FIG. 1. A laser scanner is an example for a distance measuring opto-electronic sensor, with the invention not being restricted to this type of sensor. Other examples for such sensors are three-dimensional or depth-resolving camera, for instance stereoscopic camera systems or light transit time cameras, in particular in accordance with the principle of photomixing detectors (PMDs). Such sensors can be equipped, instead of with matrix-like image sensors, also only with linear image sensors so that not the whole space is monitored, but, as with the laser scanner 10, only a two-dimensional plane.

In the laser scanner 10, a light beam 14 which is generated by a light transmitter 12, for example by a laser, and which has individual light pulses is directed into a monitored zone 18 via light deflection units 16a-b and is there remitted by an object which may be present. The remitting light 20 again arrives back at the safety scanner 10 and is detected there by a light receiver 24, for example a photodiode, via the deflection unit 16b and by means of an optical receiving system 22.

The light deflection unit 16b is made as a rule as a rotating mirror which rotates continuously by the drive of a motor 26. The respective angular position of the light deflection unit 16b is detected via an encoder 28. The light beam 14 generated by the light transmitter 12 thus sweeps over the monitored zone 18 generated by the rotational movement. If a reflected light signal 20 is received by the light receiver 24 from the monitored zone 18, a conclusion can be drawn on the angular position of the object in the monitored zone 18 from the angular position of the deflection unit 16b by means of the encoder 28.

In addition, the transit time of the individual laser light pulses from their transmission up to their reception is determined after reflection at the object in the monitored zone 18. A conclusion is drawn on the distance of the object from the safety scanner 10 from the light transit time while using the speed of light. This evaluation takes place in an evaluation unit 30 which is connected for this purpose to the light transmitter 12, to the light receiver 24, to the motor 26 and to the encoder 28. Two-dimensional measured data with polar coordinates of all objects in the monitored zone 18 are thus available via the angle and the distance. These measured data 18 are output via an interface 32.

The named functional components are arranged in a housing 34 which has a front screen 36 at the front side, that is in the region of the light exit and of the light entry. The evaluation unit 30 can, deviating from the representation, also be implemented totally or partly outside the sensor 10. In this case, raw data are output at the interface 32. Conversely, in an alternative embodiment, measured data or raw data of another sensor can be received via the interface 32 to process said data together in the evaluation unit 30.

Figure 2:
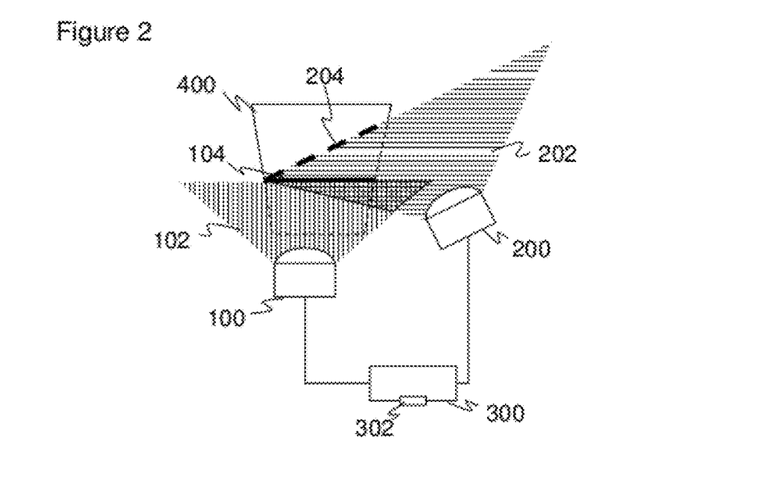
FIG. 2 a plan view of two distance measuring sensors which are fused via a common control unit with their fields of view and a planar calibration target.

FIG. 2 shows a schematic plan view of an arrangement of a first sensor 100 and of a second sensor 200. Both sensors 100, 200 can, for example, be formed as distance measuring laser scanners in accordance with the explanation of FIG. 1 and they each monitor a first monitored plane 102 and a second monitored plane 202. The sensors 100, 200 are each connected to a common control unit 300. Alternatively, the common control unit 300 can be integrated in one of the sensors 100, 200. It is conceivable to connect further sensors to the common control unit 300 in an analog manner.

The common control unit 300 receives measured data of both connected sensors 100, 200 and fuses them into a common global coordinate system so that the total arrangement behaves like a sensor with an extended field of view. The common control unit 300 can also serve to synchronize the respective individual shots of the sensors 100, 200.

In an exemplary application in safety technology, the positions and dimensions of objects are checked as to whether an object detected in the common monitored zone 102, 202 causes an unauthorized protected field intrusion. If this is the case, a switch-off signal directed to safety is output via a secure output 302. In a stationary application, this switch-off signal results, for example, in an emergency stop of a dangerous machine, whereas it acts as a braking signal or as an evasion signal in a mobile application.

A registration of the two sensors 100, 200 is a requirement for the merging of the sensor data. For this purpose, a calibration target 400 is arranged in the overlapping field of vision of both sensors 100, 200 in a registration mode. A planar plate or at least a body which has a planar surface is particularly well suited as a calibration target 400. Operating instructions can also be printed onto this surface which communicate to an operator of the calibration target 400 the required steps for registering in a brief, concise form.

The calibration target 400 intersects the monitored planes 102, 202 in a respective intersection line 104, 204. In the representation of FIG. 2, the monitored planes 102, 202 are tilted with respect to one another. Different lines of intersection 104, 204, thereby arise. But also when the monitored planes 102, 202 lie in the same geometrical plane, for instance because they are both horizontally aligned, different lines of intersection 104, 204 arise in the respective separate coordinate systems of the sensors 100, 200 due to the different perspective.

Figure 3:
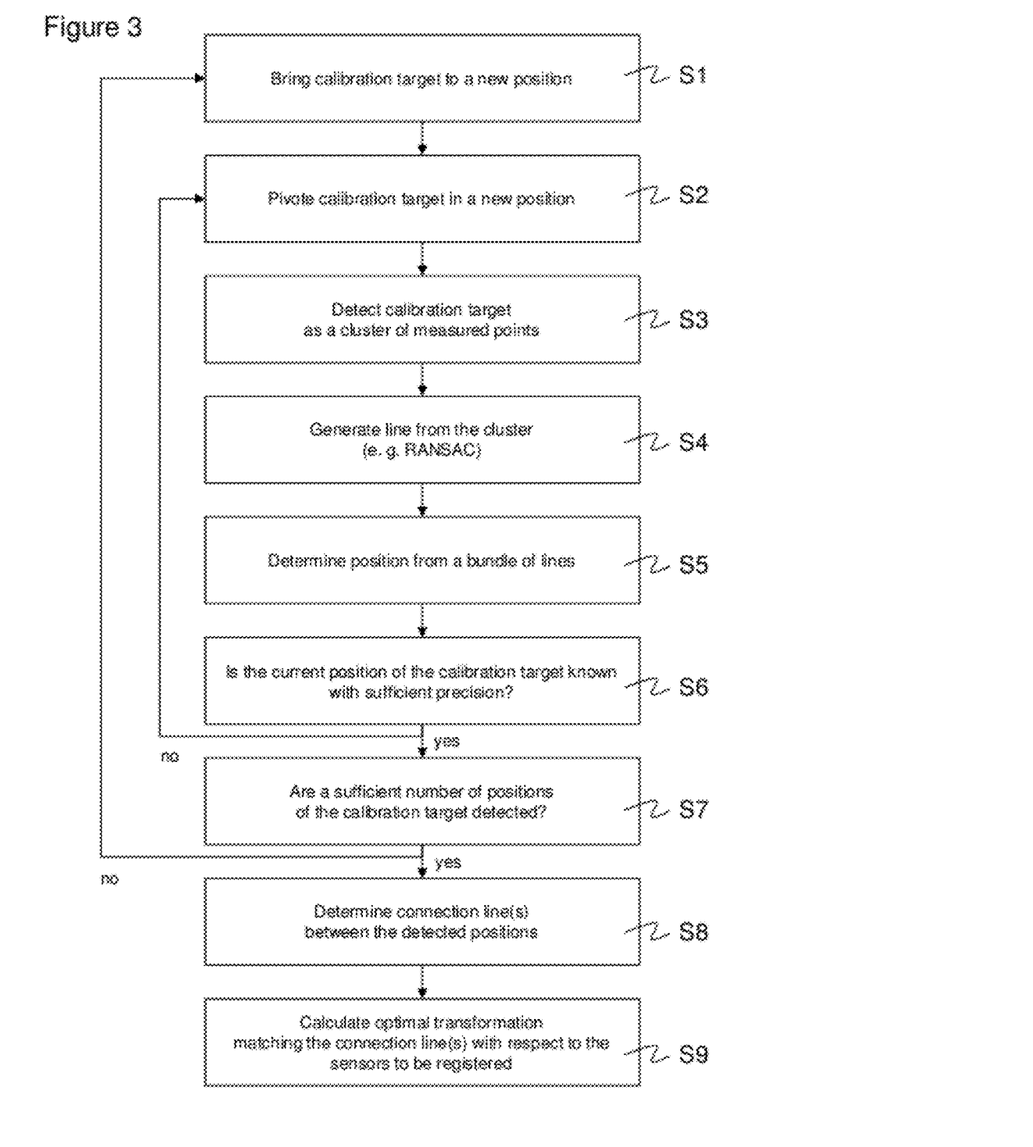
FIG. 3 a flowchart of the registering method in accordance with the invention.
Figure 4A:
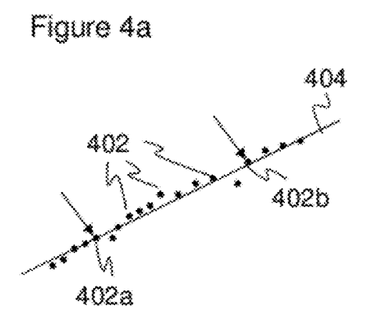
FIG. 4a an exemplary cluster of measured data of a calibration target recorded using the sensors in accordance with FIG. 1 or 2 with a line recognized therein as an intersection of monitored plane and calibration target.
Figure 4B:
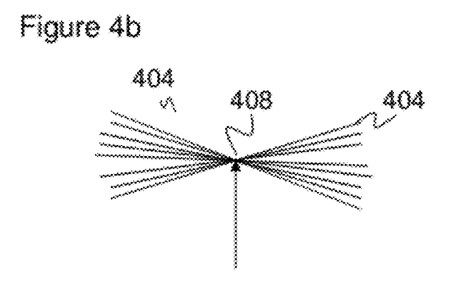
FIG. 4b a bundle of a plurality of lines in accordance with FIG. 4a which are recognized in different poses of the calibration target.
Figure 5:
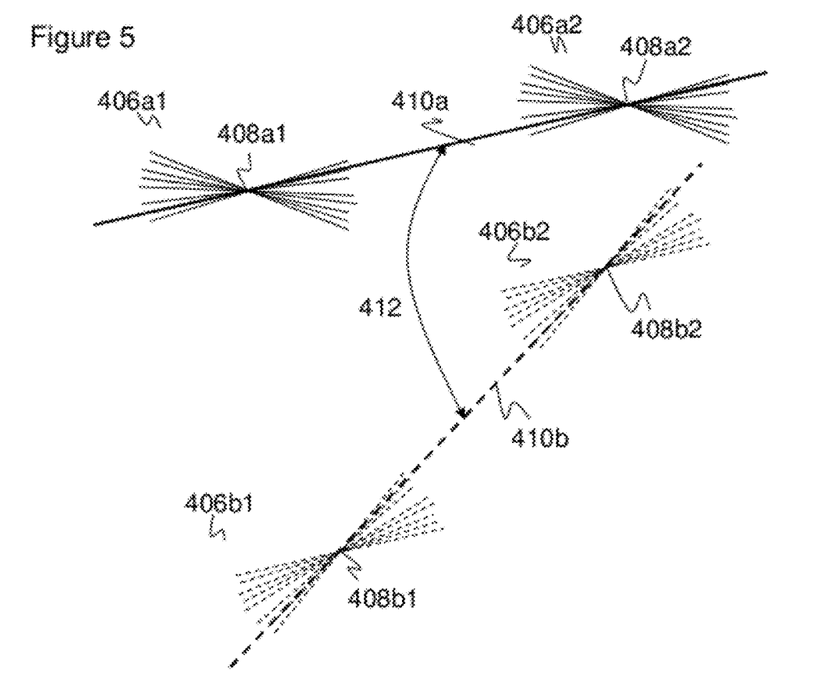
FIG. 5 a representation of a plurality of bundles in accordance with FIG. 4b at two different positions from the view of two sensors to be registered with respect to one another.
Figure 6:
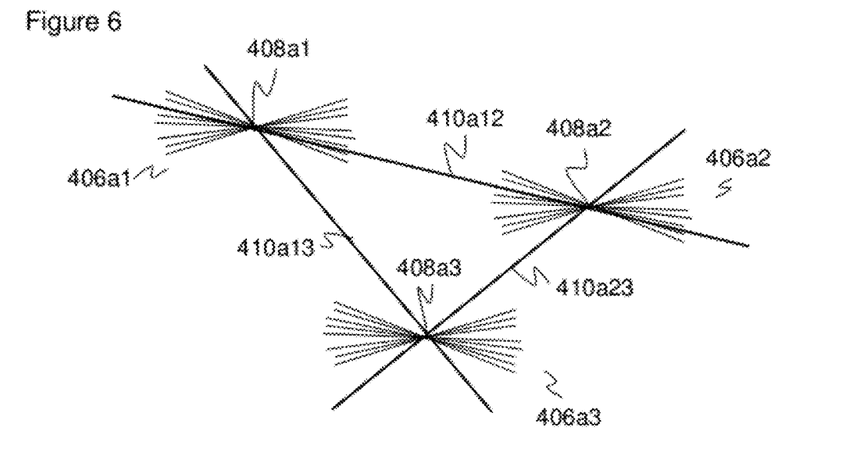
FIG. 6 a representation of three bundles in accordance with FIG. 4b from the view of only one sensor for explaining a registering method generalized to more than two position determinations.

The registration of the sensors 100, 200 in accordance with the invention with the aid of the calibration target 400 and the lines of intersection 104, 204 will be explained in the following with reference to a flowchart shown in FIG. 3. In this respect, FIGS. 4 and 5 illustrate different intermediate steps.

The background is first blended out in that measured data of the original scene are taken without the target 400 and are deducted from the later measured data. The calibration target 400 is distinguished from other foreground objects at its plane surface and in that it is presented in different positions and orientations in the course of the registration. In addition, it is possible to communicate the dimensions of the calibration target 400 to the control unit 300 or to use a calibration target 400 with standardized dimensions.

The calibration target 400 is then brought to a new position in a first step S1 of the actual registration. In this respect, the operator should make sure that the calibration target 400 is detected by both sensors 100, 200, with corresponding feedback being able to be given by the sensors 100, 200 or by the common control 300. It should also be ensured that at least two positions are selected with a sufficiently large spacing from one another in the course of the registration.

In a second step S2, the calibration target 400 is pivoted in a new pose at the selected position. In practice, this is not a discrete movement in which a selected pose is maintained, but rather a flowing pivot movement. The sensors 100, 200 are able to detect a plurality of poses within a short time from such a movement of the calibration target 400. The position itself should remain constant where possible in the pivot movement.

In an instantaneous pose, the sensors 100, 200 detect the calibration target in a third step S3 as a cluster of measured points 402 illustrated in FIG. 4a purely by way of example for one of the sensors 100, 200. The measured points 402 only lie roughly on the lines of intersection 104, 204 due to systematic and noise-induced measurement imprecisions.

A line 404 is therefore looked for in a fourth step S4, said line reproducing the position of the calibration target 400 as accurately as possible. This search ultimately corresponds to a linear regression for which numerous processes are known and suitable. A RANSAC algorithm will be briefly described here by way of example as a particularly robust process. For this purpose, two measured points 402a-b are drawn at random which define a clear line 404. How well this hypothetical line 404 represents the measured data is subsequently determined by the number of measured points 400 which lie at a tolerance distance from the line. The set of these measured points adjusted for overshoots is called a consensus set The random drawing of two measured points 402a-b is repeated a multiple of times and that line 404 is selected whose consensus set has the greatest cardinality.

In a fifth step S5, the line 404 found which represents the current pose of the calibration target 400 is added to a bundle 406 of lines shown purely by way of example in FIG. 4b which were each determined from previous poses at the same position. At the start of the registration, the bundle 406 thus comprises only one single line 404. As a rule, the position 408 of the bundle 406 can thus still not be determined sufficiently accurately. The accuracy of the position determination is therefore checked in a sixth step and, if it is still not sufficient, the process is continued with a new pose at step S2. After a plurality of loop passages, a sufficiently dense bundle 406 then arises to determine the position 408 of the bundle center with a required high accuracy by averaging or similar processes.

The resolution of the sensors 100, 200 and the size of a calibration target 400 which can be easily guided are as a rule sufficient to detect a respective plurality of measured points 402 on the calibration target 400. The position of the calibration target 400 can thus be measured sufficiently precisely. The orientation of the lines 404 is, however, determined comparatively poorly due to the noise portions of the measured points 402. If one were to try to transform the lines 404 determined from the measured points 402 of the one sensor 100, 200 into the coordinate system of the other sensor 200, 100, a substantial registration error remains due to the inaccurately determined orientation of the lines 404. Work is therefore only continued in accordance with the invention with the position 408 which is determined, for example, through the center of the bundle 408.

At least two position determinations are required for the registration in accordance with the invention. A check is therefore made in a seventh step S7 whether a sufficient number of positions was detected. If not, the calibration target 400 is brought into a new position in a repeat passage of the just explained position determination with step S1.

At least two precisely determined positions of the calibration target with respect to both sensors 100, 200 are then available in an eighth step S8. This is illustrated purely by way of example in FIG. 5. The bundles 406a1, 406a2 at the positions 408a1, 408a2 measured with respect to the first sensor 100 are in this respect shown with solid lines; the bundles 406b1, 406b3 at the positions 408b1, 408b2 measured with respect to the second sensor 200 by dashed lines, in contrast. A connection line 410a is now drawn through the positions 408a1, 408a2 with respect to the first sensor 100 and a connection line 410b through the positions 408b1, 408b2 with respect to the second sensor 200. The connection lines 410a-b practically represent a virtual plane with large dimensions with respect to the calibration target 400. In contrast to the lines 404 determined from the measured points 402 of the calibration target 400, the alignment of this virtual plane is determined very precisely because the underlying positions 408a1, 408a2, 408b1, 408b2 only have a small measurement error which is defined in step S6 and which can be reduced to the required degree by a corresponding number of poses by averaging.

In a ninth step S9, the transformation indicated by an arrow 412 is now used which merges the connection line 410a into the connection line 410b. This is the looked for conversion for the registration which indicates the translation, rotation and, possible due to a standing of the sensors 100, 200 on their heads, also the mirror position, with which measured points 402 with respect to the one sensor 100 are converted into measured points 402 with respect to the other sensor 200. In contrast to a conventional registering process in which a number of transformations would be calculated and subsequently averaged for the individual lines 404, only one single transformation has to be calculated for this purpose.

As FIG. 5 illustrates with reference to an example with three positions of the calibration target 400 from the point of view of the sensor 100, more than only two positions 408a1, 408a2 can also be required in step S7. Additional bundles 406a3, positions 408a1 and thus connection lines 410a12, 410a23, 410a13 arise which can be used in their totality or in any desired combinations as the basis for the transformation. It is no longer ensured in this respect that a transformation which brings a specific connection line 410 to coincidence also applies to the other connection lines. A standard optimization process is then applied, for instance by minimizing the least mean square to deliver the best possible agreement for all connection lines 410 observed.

If more than two sensors 100, 200 should be registered, a reference sensor is, for example, selected with respect to which the other sensors are registered after one another. A special case occurs if a plurality of sensors do not have any common field of view. There is then no common reference sensor with which all other sensors could be directly registered.

Figure 7A:
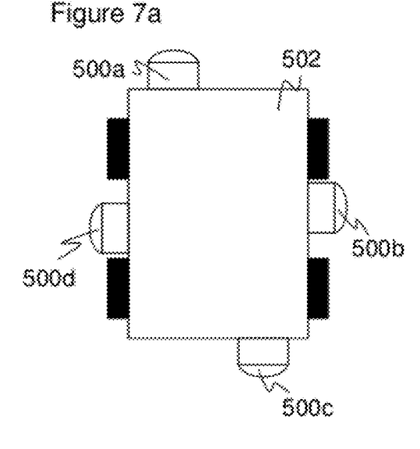
FIG. 7a a schematic plan view of a vehicle which is secured at all four sides by a distance measuring sensor.

FIG. 7a shows such an example with four sensors 500a-d which are mounted at the four sides of a vehicle 502, for instance for driving assistance or to enable driverless driving. In this respect, the fields of view overlap only pair-wise in each case due to the restricted angles of view and the blending out by the vehicle 502 itself.

Figure 7B:
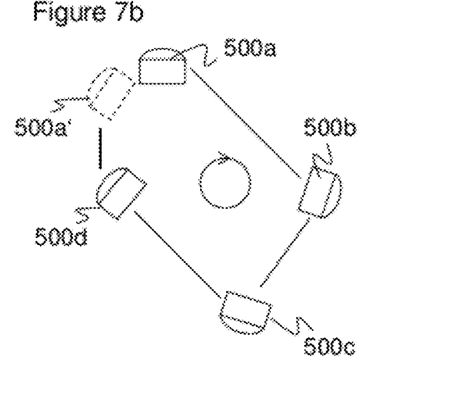
FIG. 7b an exemplary representation of the positions and orientations of the sensors in accordance with FIG. 7a from the view of the common control after the end of the registration.

The registration then takes place as shown in FIG. 7b cyclically and pair-wise, first with the first part of sensors 500a, 500b, then with the pair of sensors 500b, 500c, the pair of sensors 500c, 500d, and finally the pair of sensors 500d, 500a, as the arrow at the center of the representation indicates. Since the respective starting sensor 500a-d already has a registration error in the cyclic registrations, the position and orientation of the first sensor 500a registered again at the end of the cycle does not coincide with the original position and orientation. The individual registration errors have accumulated. To alleviate this respect, the accumulated registration errors can now be retroactively distributed uniformly over the respective pairs. At least too great a deviation of directly adjacent sensors 500a-d is thus avoided.

The invention claimed is:

1. A sensor arrangement (100, 200, 300) for object recognition in a monitored zone (104, 204), the sensor arrangement including a first distance-measuring optoelectronic sensor (100) having a field of view (104), a second distance-measuring optoelectronic sensor (200) having a field of view (204), the fields of view (104, 204) of the first and second sensors (100, 200) having a common overlap region, and the sensor arrangement also including a common control unit (300) which is formed for determining a position (408) of a calibration target (400) in the overlap region with respect to the first sensor (100) and to the second sensor (200) to determine a transformation instruction between a first coordinate system of the first sensor (100) and a second coordinate system of the second sensor (200) in a registration mode, so that measured points (402) of the sensors (100, 200) can be combined in a common global coordinate system, wherein the common control unit (300) is designed to determine in the registration mode a first position (408a1, 408b1) of the calibration target (400) and a second position (408a2, 408b2) of the calibration target (400) different from the first position (408a1, 408b1) in the overlap region with respect to the first sensor (100) and with respect to the second sensor (200) and to determine the transformation instruction as that transformation instruction which causes a connection line (410a) from the first position (408a1) to the second position (408a2) with respect to the first coordinate system to cover a connection line (410b) from the first position (408b1) to the second position (408b2) with respect to the second coordinate system, and wherein the common control unit (300) is designed to determine the position (408) of the calibration target (400) from a bundle (406) of a plurality of lines (404) which are determined in respective different poses of the calibration target (400).

2. A sensor arrangement (100, 200, 300) in accordance with claim 1, wherein said first distance measuring optoelectronic sensor is a laser scanner.

3. A sensor arrangement (100, 200, 300) in accordance with claim 1, wherein said second distance measuring optoelectronic sensor is a laser scanner.

4. A sensor arrangement (100, 200, 300) in accordance with claim 1, wherein the common control unit (300) is designed to determine in the registration mode at least one third position (408a3) different from the first position (408a1) and from the second position 408a2) with respect to the first sensor (100) and with respect to the second sensor (200) and to determine the transformation instruction as that transformation instruction which causes a plurality of connection lines (410) between the positions with respect to the first coordinate system to cover corresponding connection lines (410) with respect to the second coordinate system as best as possible.

5. A sensor arrangement (100, 200, 300) in accordance with claim 1, wherein the calibration target (400) has a planar surface; and wherein the common control unit (300) is designed to form clusters from the measured points (402) respectively taken in one pose of the calibration target (400) and to recognize the calibration target (400) in the cluster as a line (404).

6. A sensor arrangement (100, 200, 300) in accordance with claim 5, wherein the common control unit (300) is designed to recognize the line (40) in the cluster using a RANSAC process in which a sample of measured points (402a-b) is repeatedly drawn from the cluster and a determination is made how well a line (404) through the sample represents the cluster.

7. A sensor arrangement (100, 200, 300) in accordance with claim 1,
wherein the position (408) of the calibration target is determined as the position (408) of the center of the bundle (406).

8. A sensor arrangement (100, 200, 300) in accordance with claim 1,
wherein the common control unit (300) is designed to evaluate so many different poses of the calibration target (400) that the position (408) of the calibration target can be determined with a predefined precision from the bundle (406) of the associated lines (404).

9. A sensor arrangement (100, 200, 300) in accordance with claim 8, wherein the common control unit (300) is designed to give feedback to an operator whether further poses are still required to achieve the predefined precision.

10. A sensor arrangement (100, 200, 300) in accordance with claim 1, wherein the common control unit (300) is designed to determine measured points (402) of the sensors (100, 200) without the calibration target (400) in their fields of view in order to blend out these measured points (402) as background during at least one of the registration operation and the measurement operation.

11. A sensor arrangement (100, 200, 300, 500a-d) in accordance with claim 1, which includes at least one third sensor (500c-d), wherein the common control unit (300) is designed to register respective pairs of sensors selected from a plurality of sensors (500a-d) whose fields of view overlap at least pairwise, at least in part, and subsequently to distribute registration errors uniformly over all pairs of sensors (500a-d).

12. A sensor arrangement (100, 200, 300) in accordance with claim 4, wherein the calibration target (400) has a planar surface; and wherein the common control unit (300) is designed to form clusters from the measured points (402) respectively taken in one pose of the calibration target (400) and to recognize the calibration target (400) in the cluster as a line (404).

13. A sensor arrangement (100, 200, 300) in accordance with claim 12, wherein the common control unit (300) is designed to recognize the line (40) in the cluster using a RANSAC process in which a sample of measured points (402a-b) is repeatedly drawn from the cluster and a determination is made how well a line (404) through the sample represents the cluster.

14. A sensor arrangement (100, 200, 300) in accordance with claim 12, wherein the common control unit (300) is designed to determine the position (408) of the calibration target (400) from a bundle (406) of a plurality of lines (404) which are determined in respective different poses of the calibration target (400).

15. A sensor arrangement (100, 200, 300) in accordance with claim 14, wherein the position (408) of the calibration target is determined as the position (408) of the center of the bundle (406).

16. A sensor arrangement (100, 200, 300) in accordance with claim 14, wherein the common control unit (300) is designed to evaluate so many different poses of the calibration target (400) that the position (408) can be determined with a predefined precision from the bundle (406) of the associated lines (404).

17. A sensor arrangement (100, 200, 300) in accordance with claim 16, wherein the common control unit (300) is designed to give feedback to an operator whether further poses are still required to achieve the predefined precision.

18. A sensor arrangement (100, 200, 300) in accordance with claim 4, wherein the common control unit (300) is designed to determine measured points (402) of the sensors (100, 200) without the calibration target (400) in their fields of view in order to blend out these measured points (402) as background during at least one of the registration operation and the measurement operation.

19. A sensor arrangement (100, 200, 300, 500a-d) in accordance with claim 4 which includes at least one third sensor (500c-d), wherein the common control unit (300) is designed to register respective pairs of sensors selected from a plurality of sensors (500a-d) whose fields of view overlap at least pairwise, at least in part, and subsequently to distribute registration errors uniformly over all pairs of sensors (500a-d).

20. A sensor arrangement (100, 200, 300) in accordance with claim 1, wherein the sensors (100, 200) are formed as laser scanners, each laser scanner having a monitored zone (18) in the form of a monitored plane, a light transmitter (12) for transmitting a light bream (14), a light receiver (24) for generating a received signal from a light beam (20) remitted by an object in the monitored plane (18), a movable deflection unit (16a-b) for periodically scanning the monitored plane (18) and a light transit time determination unit (30) for determining the distance from the time difference between the transmission of the transmitted light beam and the reception of the remitted light beam (14, 20).

21. A sensor arrangement (100, 200, 300) in accordance with claim 20, wherein the monitored planes (18, 104, 204) of the laser scanners lie in the same plane.

22. A sensor arrangement (100, 200, 300) in accordance with claim 1, wherein a secure output (302) is provided via which a switch-off signal can be output by the common control unit (300) to a monitored source of danger when an unauthorized object intrusion into a protected zone is recognized.

23. A method of registering a first distance-measuring optoelectronic sensor (100) having a field of view (104) and a second distance-measuring optoelectronic sensor (200) having a field of view (204) using a calibration target, the fields of view (104, 204) of the first and second sensors having a common overlap region, wherein a first position (408a1, 408b1) of the calibration target (400) and a second position (408a2, 408b2) of the calibration target (400) different from the first position (408a1, 408b1) is determined in the overlap region with respect to the first sensor (100) and with respect to the second sensor (200) in a registration mode, wherein, after a registration has taken place, measured points of the sensors (100, 200) are combined in a common global coordinate system and wherein a transformation instruction is determined as that transformation instruction which causes a connection line (410a) from the first position (408a1) to the second position (408a2) with respect to the first coordinate system to cover a connection line (410b) from the first position (408b1) to the second position (408b2) with respect to the second coordinate system, and wherein a common control unit (300) determines the position (408) of the calibration target (400) from a bundle (406) of a plurality of lines (404) which are determined in respective different poses of the calibration target (400).

* * * * *